United States Patent [19]

Anderson

[11] Patent Number: 5,027,365
[45] Date of Patent: Jun. 25, 1991

[54] PULSED LASER AND METHOD

[75] Inventor: Robert S. Anderson, Livermore, Calif.

[73] Assignee: Metalaser Technologies, Inc., Pleasanton, Calif.

[21] Appl. No.: 341,439

[22] Filed: Apr. 21, 1989

[51] Int. Cl.$^5$ ............................................. H01S 3/22
[52] U.S. Cl. ...................................... 372/56; 372/106
[58] Field of Search ............... 372/9, 25, 29, 92, 97, 372/98, 99, 106, 56

[56] References Cited

U.S. PATENT DOCUMENTS

| 4,292,602 | 9/1981 | Bergqvist | 372/106 X |
| 4,461,009 | 7/1984 | Lundstrom | 372/108 |
| 4,731,788 | 3/1988 | Shoshan | 372/9 |
| 4,920,541 | 4/1990 | Baumgartner et al. | 372/23 |

Primary Examiner—Frank Gonzalez
Attorney, Agent, or Firm—A. C. Smith

[57] ABSTRACT

A structure and method for operating a copper-vapor laser involves splitting and polarizing the exiting beam of radiation into two beams of different polarization orientations. One beam is completely reflected back to the laser medium within a first external cavity, and the other beam is partially reflected back to the laser medium in a second external cavity and is also partially transmitted to provide an output beam of short pulse duration that is selectively shaped in response to the interaction within the laser medium of the two segregated beams.

2 Claims, 3 Drawing Sheets

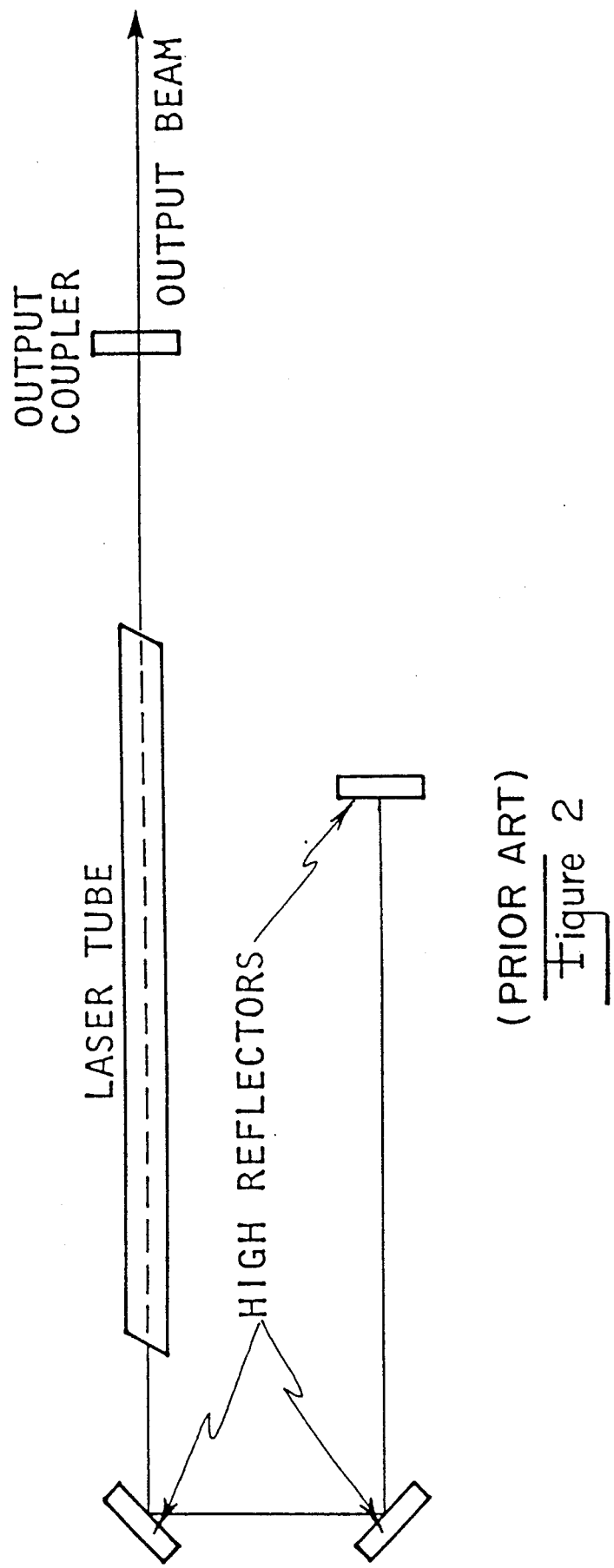
(PRIOR ART) Figure 2

PULSED LASER AND METHOD

BACKGROUND OF THE INVENTION

This invention relates to a method of creating pulses from a copper vapor laser of less than 10 nsec FWHM (Full Width Half Maximum) duration of use in such applications as femtosecond pulse amplification, frequency doubling, coastal mapping, underwater object detection, and the like.

The output pulse from a standard copper vapor laser generally includes a series of peaks, the number of which depends upon the resonator design. This pulse shape is not ideal for any of the applications mentioned above. For certain applications, it is desirable to modify the pulse temporal shape to produce a single peak of duration less than 10 nanoseconds (nsec.). One technique for doing this is to increase the laser cavity length. This effectively removes some of the peaks at the end of the pulse, but fails to remove the initial peak. In addition, it does not increase the power in the main peak. Another technique incorporates a cavity dumper or Q-switch in the laser cavity. This is not practical for copper vapor lasers because of the large beam diameters (typically greater than 1 inch). Most Q-switches with fast enough response have much smaller clear apertures, and thus have not been successfully used on copper vapor lasers.

The copper vapor laser, because of its high gain, is unpolarized. Typically lasers utilize Brewster angle windows to polarize the beam. These windows have high loss in one polarization and low loss in the other. The high loss polarization fails to support laser action because the gain is less than the loss. In copper vapor lasers, the gain is much higher than the loss and thus laser action can be supported in both polarizations. Consequently windows are not installed at Brewsters angle, but rather at a angle near normal incidence.

SUMMARY OF THE INVENTION

In accordance with the present invention, two optical cavities are formed for a copper vapor laser. One cavity utilizes one polarization (called the P polarization) and the other utilizes the other polarization (called the S polarization). Inside the laser medium, the two optical cavities overlap. Outside the laser medium, they are separated by a polarizing cube. One mirror is common to both optical cavities. A second mirror in one of the optical cavities reflects back into the laser medium less than 100% of the beam. It is called the output mirror and typically reflects back less than 10% while transmitting nearly 90% of the laser power incident upon it. A second mirror in the other optical cavity is a high reflector that typically reflects greater than 99% of the incident light, and therefore typically reflects more light than is reflected by the output mirror.

DESCRIPTION OF THE DRAWINGS

FIG. 2 is a pictorial diagram of a conventional extended-cavity copper-vapor laser;

DESCRIPTION OF THE PREFERRED EMBODIMENT

Figure 1:
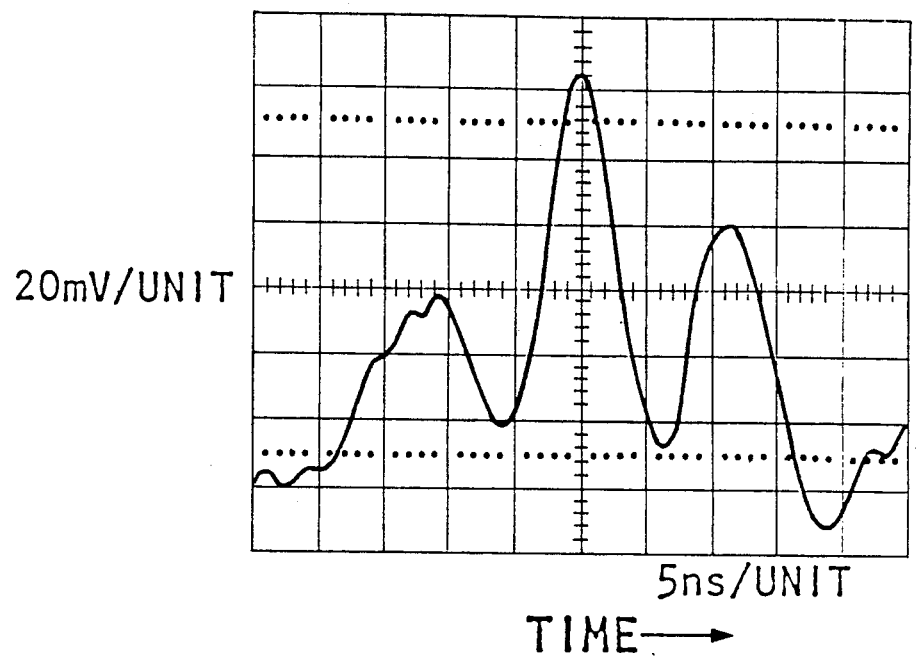
FIG. 1 is a graph illustrating the typical output pulse with time from a standard copper vapor laser.

Referring now to FIG. 1, there is shown a graph illustrating a typical multiple-pulse output waveform with time from a conventional copper-vapor laser. The number of amplitude peaks depends upon the particular resonator design and physical operating conditions of the laser. However, this multiple-pulse waveform is not well suited for many applications such as time-domain reflectometry in which a single, distinct pulse of short duration is desirable.

With reference to FIG. 2, there is shown a pictorial diagram of a conventional extended cavity copper-vapor laser that produces an output waveform in which the trailing peaks are somewhat suppressed relative to the central peak in the output waveform illustrated in FIG. 1. However, the power output of such an extended-cavity laser is not enhanced in the central peak by the power that would otherwise be present in the suppressed peaks.

Figure 4:
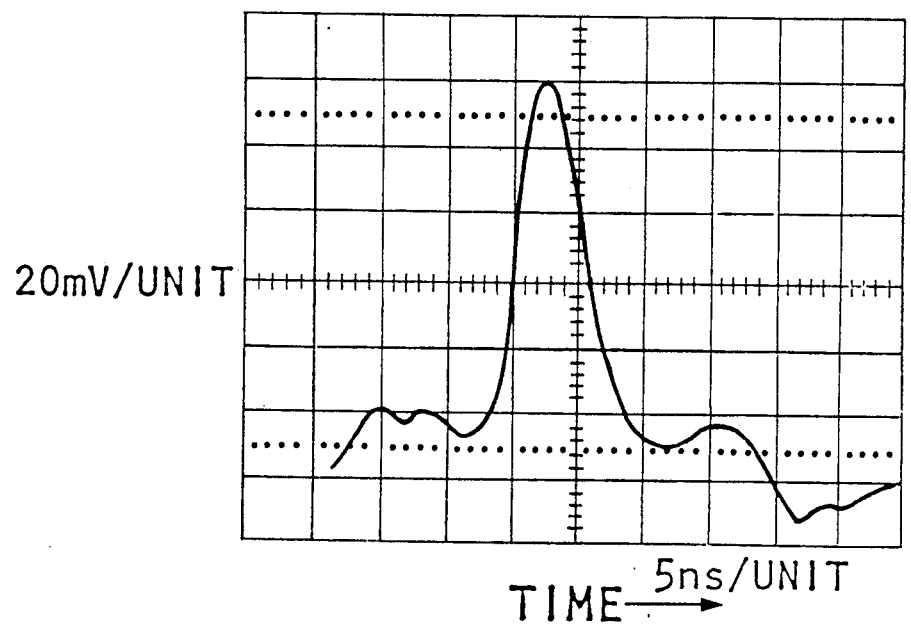
FIG. 4 is a graph illustrating the output waveform produced by the FIG. 3 embodiment of the present invention.
Figure 3:
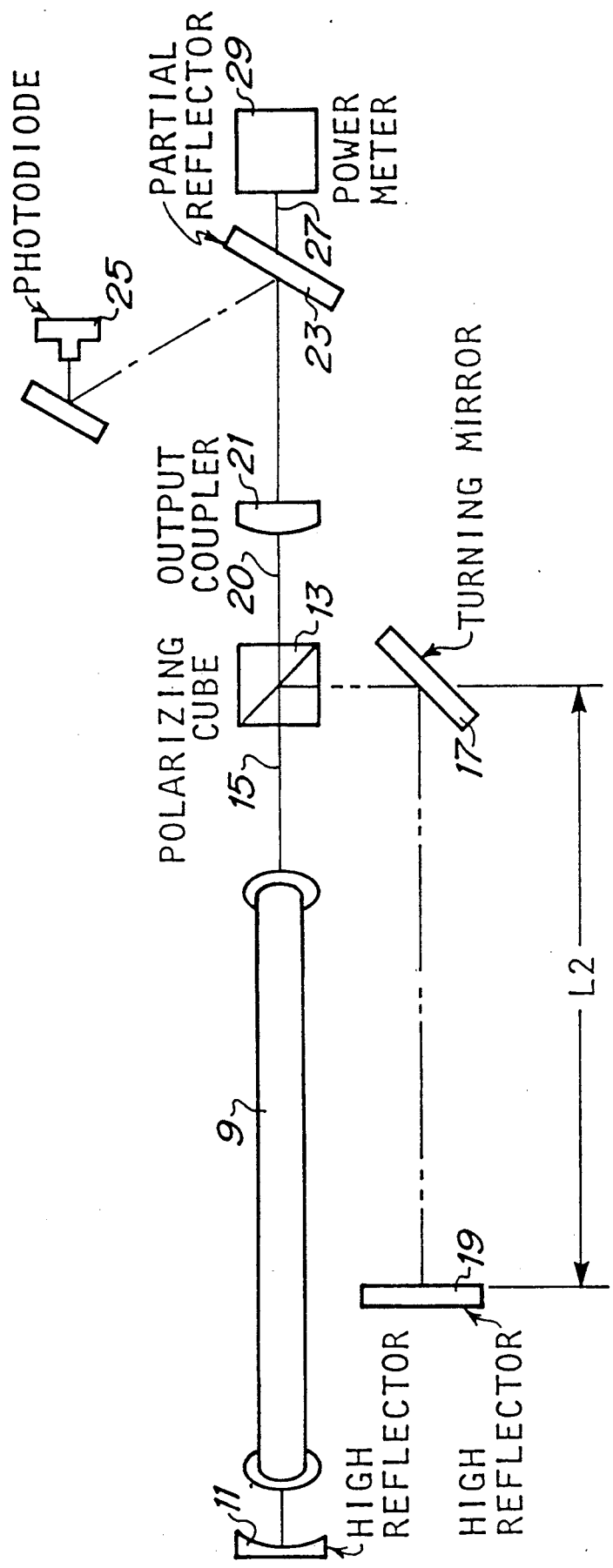
FIG. 3 is a pictorial diagram of one embodiment of a copper-vapor laser having two optical cavities according to the present invention, and which uses polarization separation to enhance the temporal beam and modify the energy distribution in the output pulse.

Referring now to FIG. 3, there is shown one embodiment of the present copper-vapor laser tube 9 having a highly-reflective reflector 11 disposed externally at one end of the tube 9 and having a conventional polarizing cube 13 disposed near the other end of tub 9. The polarizing cube 13 separates the incident laser beam 15 into two external cavities of different polarizations. The first external cavity includes the reflector 11 at one end of the tube 9, the polarizing cube 13 and the highly-reflective reflectors 17 and 19. The second external cavity includes the reflector 11, the polarizing cube 13, the output coupler 21 (which reflects part of the incident beam 20 and transmit the remaining beam), and the partial reflector 23, the angled reflection from which is supplied to a photo diode 25 to measure pulse duration, and the transmission through which is supplied as the output beam 27, for example, to an optical power meter 29. The operation of this two-cavity, copper-vapor laser transforms the temporal beam from several peaks to a single peak, as illustrated i the graph of FIG. 4. In addition, the energy in the single peak 31 is higher than the energy in any one of the series of peaks in the typical pulse. It is believed that the first peak is produced by photons which have not been reflected off the output coupler or mirror 21. Specifically, the photon beam from the laser tube 9 is highly divergent and unpolarized, and the polarizing cube 13 reflects approximately half of the beam into the other optical cavity 17, 19. This reduces the first peak in the output pulse by half. A portion of this initial light that is reflected off the output mirror 21 and is returned to the laser medium in tube 9 never completes a round trip in the cavity because it is highly divergent. Nevertheless, the interaction of the two beams within the laser medium in tube 9 extracts energy from the laser medium before energy is dissipated, for example, by striking the walls of tube 9 and being lost from the output beam. By reducing the incident beam 15 with the polarizing cube 13, energy is available to add to the main output pulse which would otherwise be lost.

The first optical cavity including reflectors 17, 19 is longer than the second optical cavity and couples no energy out. The optical field density or intensity in this one polarization is more intense since no light is coupled from the cavity and it extinguishes the optical field in the opposite polarization. If the high reflector mirror 19 in this first cavity is placed at a location close to the polarizing cube 13, the laser action in the other optical cavity incorporating the transmitting mirror 21 is reduced by half or more. If the high reflector mirror 17 is moved away from the cube 13, the stronger optical field takes longer to develop in this one cavity, and only reduces the later portion of the light pulse that passes through the transmitting mirror 21. This reduces the later peaks in the typical pulses shown in FIG. 5 and produces the pulse shown in FIG. 4. In this way, the present invention produces optical pulses from a copper vapor laser of less than about 10 nsec duration.

What is claimed is:

1. Laser apparatus comprising:

laser means confining a laser medium including copper vapor within an elongated structure;

first reflector disposed near an end of the elongated structure of said laser means to substantially completely reflect radiation from said end of the laser medium back to said laser medium;

a polarizer disposed near the other end of said elongated structure for segregating an incident beam of radiation from said other end of the laser medium into first and second separate beams of radiation, with the first beam including radiation polarized in substantially only one orientation and with the second beam including radiation polarized in substantially only another orientation different from said one orientation;

second reflector means disposed within said first beam for substantially completely reflecting the first beam back through said polarizer to said laser medium; and partial reflector means disposed in said second beam to transmit a portion of an incident beam therethrough and to reflect another portion of an incident beam back through said polarizer to said laser medium.

2. The method of operating laser apparatus comprising the steps of:

forming a laser medium including copper vapor;

stimulating the laser medium to emit a beam of radiation;

segregating the beam of emitted radiation into separate beams of radiation having different polarization orientations;

substantially completely reflecting one segregated beam of radiation of one polarization orientation back to the laser medium;

partially reflecting a portion of another segregated beam of radiation of a different polarization orientation back to the laser medium; and transmitting another portion of said other segregated beam of radiation of said different polarization orientation to provide an output beam of the laser apparatus.

* * * * *